United States Patent [19]

Izumo et al.

[11] Patent Number: 5,221,725
[45] Date of Patent: Jun. 22, 1993

[54] REACTIVE INJECTION MOLDING RESINOUS COMPOSITION

[75] Inventors: Takaharu Izumo; Satoshi Yamamoto; Hideo Ishibashi, all of Osaka, Japan

[73] Assignee: Nippon Paint Co., Ltd., Japan

[21] Appl. No.: 627,936

[22] Filed: Dec. 17, 1990

[30] Foreign Application Priority Data

Dec. 18, 1989 [JP] Japan .................................. 1-328670

[51] Int. Cl.⁵ .................... C08G 18/10; C08G 18/32
[52] U.S. Cl. ........................ 528/64; 528/44; 528/59; 528/73; 528/76; 528/77
[58] Field of Search ............... 528/28, 73, 59, 76, 528/77, 44, 64

[56] References Cited

U.S. PATENT DOCUMENTS 4,798,849  1/1989  Thomas et al. ................ 521/114
4,808,636  2/1989  Saito et al. ..................... 528/76

Primary Examiner—John Kight, III
Assistant Examiner—Duc Truong
Attorney, Agent, or Firm—Wenderoth, Lind & Ponack

[57] ABSTRACT

A reactive injection molding resinous composition which is excellent in molding, properties and capable of resulting an injection-molded polyurea product having both excellent heat resistance and impact strength is provided, the resinous composition comprising, as polyamine components:

(1) a polyoxyalkylene polyamine having an average molecular weight of 1,000-10,000 and 2 or more aliphatic amino groups, (2) a polyoxyalkylene polyamine product (A) obtained by the reaction of a polyoxyalkylene polyepoxy compound having an average molecular weight of 1,000-10,000 and an aromatic diamine having a molecular weight of 108-400, (3) a polyoxyalkylene polyamine product (B) obtained by the reaction of a polyoxyalkylene polyepoxy compound having an average molecular weight of 270-1,000 and an aromatic diamine having a molecular weight of 108-400, and (4) an aromatic diamine having at least one alkyl or thioalkyl substituent at the ortho position of respective amino group and an average molecular weight of 122-400, and as polyisocyanate components, (5) an aromatic polyisocyanate compound having an average molecular weight of 174-1,500, (6) an aliphatic polyisocyanate compound having an average molecular weight of 158-1,500, and (7) a liquid polyisocyanate prepolymer product obtained by the reaction of said (5) or (6) and a liquid polydiene compound having an average molecular weight of 1,000-5,000 and having 2 or more reactive functional groups selected from HD, amino, carboxyl and epoxy groups.

6 Claims, No Drawings

REACTIVE INJECTION MOLDING RESINOUS COMPOSITION

SCOPE OF THE INVENTION

The present invention relates to a reactive injection molding resinous composition and more specifically, it concerns a resinous composition which is excellent in molding properties and is capable of resulting in an injection-molded polyurea product having both excellent heat resistance and impact strength.

BACKGROUND OF THE INVENTION

Recently, production of urethane bampers or the like in a mold by means of reactive injection molding is being watched with keen interest and various proposals have been made as stated, for example, in U.S. Pat. No. 4,254,069: ibid 3,838,076, ibid 4,216,543: ibid 4,246,363: ibid 4,269,945 and the like.

In this area, a specifically attractive one is the method of Japanese Patent Publication (unexamined) 188643/83, wherein a mixture of end-amine bearing polyethers having an average molecular weight of 1,500 or more, end-amine bearing chain extender and polyisocyanate is reacted in a closed mold to give an elastic polyurea injection-molding which is excellent in mechanical strength, heat resistance and other desired properties.

Recently, as an automobile decorative material, various plastics have been examined and some are actually used in certain areas.

Since a polyurethane molding obtained by the reaction of polyalkylene polyol and polyisocyanate in a mold has many problems such that polyurethane is rather poor in heat resistance, is expensive and has certain limits in its coating, public interests are prone to move, from polyurethane/polyurea, to polyurea which has excellent heat resistance.

However, the reaction speed between an end-amine bearing polyether and polyisocyanate is much higher than the reaction speed between a polyether polyol and polyisocyanate, and therefore, in the case of such polyurea molding, the reaction mixture must be filled in a mold within a very short period of time, say 1 second or less.

This, in turn, may give rise to certain difficulties in both respects of apparatus and materials to be used.

That is, there are problems of efficient control in the optimum speed and in the viscosity of the injected material.

The principal object of substituting polyurea for polyurethane in an automobile exterior panel is to simplify the automobile production line by enabling the simultaneous application and baking the enamel on the assembly for both steel and plastic components.

Therefore, such molding should preferably well withstand any thermal deformation at the baking temperature in an electro-deposition coating line.

However, polyurea materials with excellent heat resistance properties tend to be more brittle than polyurethane, and therefore, have a lower impact resistance.

Therefore, an essential feature of the work is the development of a new reactive injection molding resinous composition that will give both excellent heat resistance and impact resistance.

SUMMARY OF THE INVENTION

According to the present invention, the abovementioned object can be attained with a reactive injection molding resinous composition comprised of polyamine components,
(1) a polyoxyalkylene polyamine having an average molecular weight of 1,000 to 10,000 and containing in its molecule 2 or more aliphatic amino groups,
(2) a polyoxyalkylene polyamine product (A) obtained by mixing (i) a polyoxyalkylene polyepoxy compound having an average molecular weight of 1,000 to 10,000 and containing in its molecule 2 or more epoxy groups and (ii) an aromatic diamine having a molecular weight of 108 to 400 so that amino groups become in excess of epoxy groups in terms of equivalent amount and reacting the mixture,
(3) a polyoxyalkylene polyamine product (B) obtained by mixing (iii) a polyoxyalkylene polyepoxy compound having an average molecular weight of 270 to 1,000 and containing in its molecule more than 2 epoxy groups and (ii) an aromatic diamine having a molecular weight of 108 to 400 so that amino groups become in excess of epoxy groups in terms of equivalent amounts and reacting the mixture, and
(4) an aromatic diamine (as a chain extender) having an average molecular weight of 122 to 400 and having at least one alkyl or thioalkyl substituent at the ortho position of the respective amino group, and polyisocyanate components,
(5) an aromatic polyisocyanate compound having an average molecular weight of 174 to 1,500 and containing in its molecule 2 or more isocyanate groups,
(6) an aliphatic polyisocyanate compound having an average molecular weight of 158 to 1,500 and containing 2 or more isocyanate groups, and
(7) a liquid polyisocyanate prepolymer product obtained by mixing an aromatic or aliphatic polyisocyanate compound having an average molecular weight of 158 to 1,500 and containing in its molecule 2 or more isocyanate groups and a liquid polydiene compound having an average molecular weight of 1,000 to 5,000 and containing in its molecule 2 or more reactive functional groups selected from hydroxyl, amino, carboxyl and epoxy groups so that isocyanate groups become in excess of said reactive functional groups and reacting the mixture.

The polyamine components used in the present reactive injection molding resinous composition are composed of the above-mentioned 4 groups.

The first group of polyamine component is a polyoxy alkylene polyamine (1) represented by the formula:

$$R(NH_2)_n$$

in which R is polyoxyalkylene and n is an integer of 2 or more, which is advantageously obtained by effecting amination of end hydroxyl groups of polyoxyalkylene polyol having an average molecular weight of 1,000 to 10,000.

The polyoxyalkylene polyol used as the starting material may be advantageously prepared by effecting ring polymerization of an alkylene oxide on an active hydrogen containing compound by a conventional means.

As the active hydrogen containing compounds, mention is given to the compounds bearing such groups as hydroxyl, carboxyl, amine, hydrazine, imine, amide, guanidine, sulfonamide, urea, thiourea, mercapto, thiophenol, thiocarboxyl and the like.

Examples of such compounds are diols such as ethyleneglycol, 1,2-propyleneglycol, 1,3-propyleneglycol, 1,3-butanediol, 1,4-butanediol, 1,2-butanediol, 2,3-butanediol, 3-chloro-1,2-propyleneglycol, 1,4-hexanediol, 1,5-hexanediol, 1,6-hexanediol, 1,2-octanediol, 1,3-octanediol, 1,4-octanediol, 1,6-octanediol, 1,8-octanediol, 1,10-decanediol and the like; triols such as glycerin, 1,2,6-hexanetriol, 1,1,1-trimethylolethane, 1,1,1-trimethylol propane and the like; polyols such as erythritol, pentaerythritol, pentite, sorbitol, xylite, arabibite, mannitol and the like; trialkanolamines such as triethanolamine, triisopropanolamine, tributanolamine and the like; amines such as methylamine, ethylamine, isopropylamine, butylamine, benzylamine, aniline, toluidine, naphthylamine, ethylenediamine, diethylenetriamine, triethylenetetramine, 1,3-butanediamine, 1,3-propanediamine, 1,4-butanediamine, 1,2-hexanediamine, 1,3-hexanediamine, 1,4-hexanediamine, 1,5-hexanediamine, 1,6-hexanediamine, phenylenediamine, toluenediamine, naphthalenediamine and the like; toluenediamines; nonreducing sugar or derivatives thereof such as cane sugar, alkylglucoside (ethylglucoside and the like), glycolglucosides (e.g. ethyleneglycolglucoside, propyleneglycolglucoside, glyceringlucoside, 1,2,6-hexanetriolglucoside and the like); polyphenols such as 2,2-bis (4-hydroxyphenyl propane, bis (4-hydroxyphenyl) methane, condensation products of phenol and formaldehyde, novolak resin, condensation products of phenolic compound and acrolein (e.g. 1,1,3-tris (hydroxyphenyl) propane and the like), condensation products of phenolic compound and glyoxal, glutaraldehyde or other dialdehyde (e.g. 1,1,2,2-tetrakis (hydroxyphenyl) ethane and the like); condensation products of aromatic amines such as aniline, toluidine and the like, phenols such as phenol, cresol and the like, and aldehydes such as formaldehyde and the like; phosphoric acids such as phosphoric acid, phosphorous acid, polyphosphoric acid (e.g. tripolyphosphoric acid, polymethaphosphoric acid and the like); polytetramethyleneglycol; glycerides such as castor oil and the like and halogenides thereof.

One or more of the above-mentioned compounds may satisfactorily be used.

Amongst them, particular preference is given to one or more of the members selected from glycerin, trimethylolpropane, pentaerythritol, sorbitol, ethylenediamine, diethylenetriamine, cane sugar and 2,2-bis (4-hydroxyphenyl) propane.

The most preferable members are glycerin, trimethylol propane, pentaerythritol, mixtures of cane sugar and glycerin, ethylenediamine and the like.

The second group of polyamine component is a polyoxy alkylene polyamine product (A) obtained by reacting an excess amount of specific aromatic diamine (ii) with a specific polyoxy alkylene polyepoxy compound (i).

Such polyoxyalkylene polyepoxy compound (i) can be obtained by effecting epoxidation of polyoxyalkylene polyol (stated in for example, Japanese Patent Publication (unexamined) 31513/78, Brit Patent 1286676, U.S. Pat. No. 3,445,525 and the like with epichlorohydrin, the compound (i) having a number average molecular weight of about 1,000 to 10,000 and containing in its molecule 2 or more epoxy groups.

Various polyepoxy compounds belonging to this class have been marketed, as, for example, DENACOL EX-2000 (polyoxypropylene glycol diglycidyl ether, epoxy equivalent about 1,100 g, trade mark of Nagase Kasei Kogyo K.K.), DENACOL EX-400 (polyoxypropylene glycol diglycidyl ether, epoxy equivalent about 2,270 g, trade mark of Nagase Kasei Kogyo K.K.) and the like.

Examples of the aromatic diamines (ii) are 1-methyl-3,5-dimethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane, 3,5-diethylthio-2,4-toluenediamine, 3,5-dimethylthio-2,6-toluenediamine and the like.

Particularly preferable diamine compounds are 1-methyl-3,5-diethyl-2,6-diaminobenzene, 1-methyl-3.5-diethyl-2,4-diaminobenzene and mixtures thereof.

The molecular weights of these diamines are, in general, in a range of 108 to 400.

The abovementioned polyoxyalkylene polyepoxy compounds and aromatic diamines are reacted in such ratios that amino groups in excess of epoxy groups in terms of equivalent amounts and therefore, the reaction product includes, besides the desired polyoxyalkylene polyamine (2), certain amounts of unreacted aromatic diamines.

The third group of polyamine components is a polyoxyalkylene polyamine product (B) obtained by the reaction of excess amounts of particular aromatic diamines (ii) and particular polyoxyalkylene polyepoxy compounds (iii).

The polyoxyalkylene polyepoxy compound (iii) should have a number average molecular weight of about 270–1,000, preferably 270–500, and contain in its molecule more than 2 epoxy groups.

Such compounds (iii) may be obtained by effecting epoxidation of end groups of polyoxyalkylene polyol compounds with epichlorohydrin as disclosed in, for example, Japanese Patent Publication (unexamined) 31513/78; GB 1,286,676; U.S. Pat. No. 3,445,525 and the like.

Various products are available in the market such as DENACOL EX-321 (trimethylol propane polyglycidyl ether, epoxy equivalent about 145, trademark, Nagase Kasei Kogyo K.K.), DENACOL EX-411 (pentaerythritol polyglycidyl ether, epoxy equivalent about 231, trademark of Nagase Kasei Kogyo K.K.), DENACOL EX-301 [triglycidyl tris (2-hydroxyethyl) isocyanurate, epoxy equivalent about 242, trademark of Nagase Kasei Kogyo K.K.] and the like, and all of these products are successfully and advantageously used in the present invention.

Examples of the aromatic diamine (ii) are 1-methyl-3,5-diethyl-2,4-diaminobenzene, 1-methyl-3,5-diethyl-2,6-diaminobenzene (both of them may sometimes be called diethyltoluene diamine or DETDA), 1,3,5-triethyl-2,6-diaminobenzene, 3,5,3',5'-tetraethyl-4,4'-diaminodiphenyl methane, 3,5-diethyl thio-2,4-toluenediamine, 3,5-dimethyl thio-2,6-toluenediamine and the like, and include the same members as stated herein before.

Particularly preferable members are 1-methyl-3,5-diethyl-2,6-diaminobenzene, 1-methyl-3,5-diethyl-2,4-diaminobenzene or mixtures thereof.

These diamines usually have an average molecular weight of 108–400.

The abovementioned polyoxyalkylene polyepoxy compounds and diamines are reacted with each other in such weight ratios that the amino groups become in excess of epoxy groups in terms of equivalent amounts and therefore, the resulting product includes, besides the desired main product of polyoxyalkylene polyamine (3), certain amounts of unreacted aromatic diamines used.

In this invention, as the fourth polyamine component and as a chain extender, is used an aromatic diamine (4) having at least one alkyl or thioalkyl substituent at the ortho position of the respective amino group.

Examples of such aromatic diamines are 1-methyl-3,5-diethyl-2,4-diaminobenzene, 1-methyl-3,5-diethyl-2,6-diaminobenzene (both of them are sometimes called diethyltoluene diamine or DETDA), 1,3,5-triethyl-2,6-diaminobenzene, 3,5,3′,5′-tetraethyl-4,4′-diaminodiphenylmethane, 3,5-diethyl thio-2,4-toluenediamine, 3.5-dimethyl thio-2,6-toluenediamine and the like.

Particularly preferred members are 1-methyl-3,5-diethyl-2,6-diaminobenzene, 1-methyl-3,5-diethyl-2,4-diaminobenzene or mixtures thereof.

In this invention, the following three polyisocyanates are used as the hardening component for the abovementioned (1)-(4) polyamines.

The first group of polyisocyanates is an aromatic polyisocyanate compound (5) customarily used in the preparation of polyurea or polyurethane resin, i.e. an aromatic polyisocyanate having in its molecule 2 or more isocyanate groups and having an average molecular weight of 174-1,500.

Typical examples are p-phenylene diisocyanate, polymethylene polyphenyl isocyanate, 2,6-toluenediisocyanate, dianisidine diisocyanate, bitolylene diisocyanate, naphthalene-1,4-diisocyanate, bis (4-isocyanate phenyl) methane, bis (3-methyl-3-isocyanatephenyl) methane and 4,4′-diphenylpropane diisocyanate.

Particularly preferred members are methylene bis (4-phenyl isocyanate) in the form of pure MDI, a MDI prepolymer or modified MDI.

The second group of polyisocyanates is an aliphatic polyisocyanate compound (6) having an average molecular weight of 158-1,500 and containing 2 or more isocyanate groups.

Typical examples are dicyclohexyl methane-4,4′-diisocyanate, isophorone diisocyanate, hexamethylene diisocyanate, hydrogenated xylylene diisocyanate, their isocyanurated derivatives, their carbodimidized modified products and the like.

Particularly preferred aliphatic polyisocyanates are pure hexamethylene diisocyanate, hexamethylene diisocyanate prepolymer and modified hexamethylene diisocyanate.

The other group of the polyisocyanate component is a liquid polyisocyanate prepolymer product (7) obtained by mixing and reacting an aromatic or aliphatic polyisocyanate compound having an average molecular weight of 158-1,500 and containing in its molecule 2 or more isocyanate groups and a liquid polydiene compound having an average molecular weight of 1,000-5,000 and containing in its molecule 2 or more reactive functional groups selected from hydroxyl, amino, carboxyl and epoxy groups so that isocyanate groups become in excess of the said reactive functional groups.

The polyisocyanate compound to be pre-reacted with the said polydiene compound may be any members selected from liquid organic polyisocyanates customarily used for the preparation of polyurethane or polyurea or isocyanate prepolymers obtained by the partial reaction of organic polyisocyanates and polyether polyols or polyamines, providing there is contained in the molecule 2 or more isocyanate groups having an average molecular weight of 158-1,500, preferably 158-500.

Examples of aromatic polyisocyanates are p-phenylene diisocyanate, polymethylene polyphenylisocyanate, 2,6-toluene diisocyanate, dianisidine diisocyanate, bitolylene diisocyanate, naphthalene-1,4-diisocyanate, bis (4-isocyanate phenyl) methane, bis (3-methyl-3 isocyanate phenyl) methane and 4,4′-diphenyl propane diisocyanate.

Examples of aliphatic polyisocyanates are dicyclohexyl methane-4,4′-diisocyanate, isophorone diisocyanate, hexamethylene diisocyanate, hydrogenated xylylene diisocyanate, their isocyanurated derivatives and carbodiimidized modified products and the like.

Particularly preferred members are such aromatic polyisocyanates such as the pure MDI form of methylene bis (4-phenyl isocyanate), MDI, MDI prepolymer and modified pure MDI, and such aliphatic polyisocyanates as pure hexamethylene diisocyanate, hexamethylene diisocyanate prepolymer, modified hexamethylene diisocyanate and the like.

The liquid polydiene compound having at the both ends NCO-reactive functional groups, to be reacted with the abovementioned polyisocyanate for the preparation of polyisocyanate prepolymer (7), should have an average molecular weight of 1,000-5,000.

Many compounds coming under this category have been known and we available in the market, including polybutadiene R45-HT (trademark of Idemitsu Ahko K.K., ω-polybutadieneglycol, average molecular weight about 2,800, OH equivalent about 1,220 g), Nisso PBG-1000 (trademark of Nihon Soda K.K., α,ω-polybutadieneglycol, average molecular weight 1,350 OH equivalent about 742 g), Highcar CTBN 1,300×31 (trademark of Ube Kosan K.K., α,ω-dicarboxylpolybutadiene-acrylonitrile copolymer, average molecular weight about 3,500, bound AN 17%, COOH equivalent 1,822 g, average functional group number 1,9/mol) and the like.

Other examples are polyolefinic polyols such as Epol (trademark of Idemitsu Sekiyu Chem. Co., hydrogenated polyisopreneglycol, average molecular weight about 2,500, OH equivalent about 1,110) and hydrogenated polybutadiene resin such as, for example, Nisso PB-GI-1000 (trademark of Nihon Soda K.K.) and various modified products thereof.

The abovementioned polyisocyanate and liquid polybutadiene are reacted so that isocyanate groups are in excess, preferably 2 times or more and most preferably 5 times or more excess, of the NCO-reactive functional groups in terms of equivalent amount.

The thus formed polyisocyanate prepolymer may, therefore, contain, besides the reaction product of polyisocyanate-polybutadiene-polyisocyanate, an excess amount of polyisocyanate compound used as the starting material.

The principal object of this invention is to provide a resinous composition for injection molding use which is excellent in molding properties and capable of resulting in a polyurea injection-molded product being excellent in both thermal resistance and impact strength at low temperatures.

To attain the abovementioned object, the inventors have found the following are very important for in the practical point of view.

(1) Equivalent amount ratios of average amino groups of polyamine components (1)-(4) to average isocyanate groups of polyisocyanate components (5)-(7) should be 1:0.7-1:1.5, preferably 1:0.95-1:1.25 and most preferably 1:1.01-1:1.10.

(2) In order to obtain a cured product which is well resistive to cracking in a mold and excellent in thermal resistance, the content of the polyoxyalkylene polyamine included in the polyoxyalkylene polyamine product (B) should preferably be in a range of 3.0-10.0 weight % of the total weight of the composition.

(3) To attain a cured product which is particularly excellent in impact strength, the polydiene chain content included in (7) should preferably be at least 6.5% by weight of the total resin weight and the aromatic ring content included in (1)-(7) should preferably be at most 40% by weight of the total resin weight.

(4) In order to obtain a cured product which is particularly excellent in thermal resistance, the aromatic ring content included in (1)-(7) should preferably be at least 30% by weight of the total resin weight and the polyoxyalkylene polyamine content included in (3) be at least 3.0% by weight of the total resin weight.

(5) To secure an appropriate flowability of the composition, it is desired to increase the amounts of (1) and (4) among the polyamine components (1)-(4).

However, with the increase in the amount of component (4), there is an accompanying increase in aromatic ring content in the total system, resulting in an undesired decrease in impact strength of the molded product.

Therefore, under the circumstances, it is preferred to increase the amount of polyoxyalkylene polyamine (1) having aliphatic amino groups as high an amount as possible. However, this always gives the additional problem that when subjected to injection molding, the curing speed, i.e. reaction speed of the mixture of polyamine components and polyisocyanate components, will become too high, giving an undesired decrease in mold-filling properties of the composition.

The polyamine component (1) may be increased up to 50% by weight of the total polyamine components (1)-(4), but from the standpoint of thermal resistance of the molded product, it should preferably be 30% or less of the total polyamine components.

(6) In order to control the curing speed at the time of injection molding within an appropriate range, it is highly recommended to use an appropriate amount of aliphatic polyisocyanate (6) and isocyanate component.

To lower the curing speed, the amount of aliphatic polyisocyanate should preferably be increased as high as possible among the polyisocyanate components (5)-(7).

However, to adjust the aromatic ring content at the desired level for the attainment of appropriate curing and heat resistant properties, the aliphatic polyisocyanate component (6) should be at most 20% by weight of the total polyisocyanate components.

The present resinous composition comprises particular polyamine components and polyisocyanate components. Since the curing is achieved at comparatively slow speed, the present composition is characterized by having a considerably long flowability retention time, as long as 1.3 seconds or more, and hence, workability and molding properties are greatly improved compared with the conventional polyurea composition.

At the stage of impingement-mixing of the principal component and hardener component and curing of the thus obtained mixture, there occurs phase separation due to the poor compatibility.

In this invention, making use of the abovementioned phenomenon, it is possible to obtain an elastomeric product having sea-and-island structures, the said sea being mainly composed of polyurea components and the islands being mainly composed of polydiene components, characterized by having improved heat distortion resistance at higher temperatures and improved impact resistance at lower temperatures.

For the actual use of the present resinous composition in a reactive injection molding, other additives such as a surfactant, foam stabilizer, fire-retardant, plasticizer, dyestuff, filler, fungicide, bactericide, various reinforcing materials, an inner mold release agent and the like may be advantageously used as desired.

Thus, the present resinous composition has an improved workability and molding property as an injection molding material, and can result in an injection-molded product which is free from the disadvantages possessed by the heretofore known injection-molded products and is excellent in thermal resistance.

Therefore, the injection-molded products can be advantageously applied with a common, baking-type coating composition and hence, the present composition is specifically useful in the automobile and other industries.

The invention shall be now more fully explained in the following Examples.

In this specification and claims, the term "aromatic ring content in the total weight of the cured resin" shall mean the ratio of total aromatic ring weight/total weight of polyamine and polyisocyanate, the aromatic ring weight being the weight of benzene ring and hydrogen atoms directly bonded there to.

The polydiene chain content in the cured resin shall mean the ratio of total polydiene chain weight/total weight of the cured resin, providing taking the diene series compound, which is still unmodified with isocyanate compound, as a polydiene chain.

The polyoxyalkylene polyamine content in the polyamine product (B) is defined, in this specification, as being equal to the difference between the polyoxyalkylene polyamine product (B) and the remaining aromatic diamine used.

MANUFACTURING EXAMPLES 1-3

Preparation of liquid polyisocyanate $\alpha,\omega$-polybutadieneglycol (polybutadiene R45-HT) and diphenylmethane diisocyanate (Millionate MTL, Nippon Polyurethane Kogyo K.K. NCO equivalent about 145 g) were reacted in a weight ratio of 50:50 (equivalent ratio of OH groups: isocyanate groups of 1:8.4), at 80° C. for 3 hours to obtain a liquid polyisocyanate (a) (viscosity 10,000 cps, 25° C.).

Hydrogenated polyisopreneglycol (Epol) and diphenyl methanediisocyanate (Millionate MTL) were reacted, in a weight ratio of 25:100 (equivalent ratio of OH groups: NCO groups of 1:30), at 80° C. for 3 hours to obtain a liquid polyisocyanate (b) (viscosity 200 cps, 25° C.).

Separately, α,ω-polybutadieneglycol (polybutadiene R45-HT) and hexamethylene diisocyanate (HDI, Nippon Polyurethane Kogyo K.K., NCO equivalent = about 84 g) were mixed in a weight ratio of 290:100 (equivalent ratio of OH groups: NCO groups of 1:5) and reacted at 80° C. for 3 hours to obtain a liquid polyisocyanate (c) (viscosity 6,000 cps, 25° C.).

weight of Millionate MTL, 15 parts by weight of Coronate EH and 70 parts by weight of polyisocyanate sample (a) were, while impingement-mixing in a weight ratio of A:B of 100:136, placed into a mold and subjected to an injection-molding under the following conditions:

TABLE 1

Preparation of liquid polyisocyanate prepolymers.

| Sample No. | (A) liquid polybutadiene | (B) polyisocyanate | (A)/(B) weight ratio | (A)/(B) equiv. ratio | reaction conditions | viscosity of the product |
|---|---|---|---|---|---|---|
| a | α,ω-polybutadiene glycol*[1] | crude diphenyl methane diisocyanate*[3] | 50/50 | 1/8.4 | 3 hours at 80° C. | 10,000 |
| b | hydrogenated isoprene polymer*[2] | crude diphenyl methane diisocyanate*[3] | 25/100 | 1/30 | 3 hours at 80° C. | 200 |
| c | α,ω-polybutadiene glycol*[1] | hexamethylene diisocyanate*[4] | 290/100 | 1/5 | 3 hours at 80° C. | 6,000 |

*[1] Poly bd R-45HT (Idemitsu-Ahco K.K., average molecular weight about 2,800, OH equivalent about 1,220 g)
*[2] Epol (Idemitsu Sekiyu Kagaku, average molecular weight about 2,500, OH equivalent about 1,110 g)
*[3] Millionate MTL (Nihon Polyurethane Kogyo, NCO equivalent about 145 g)
*[4] HDI (Nihon Polyurethane Kogyo, NCO equivalent about 84 g)

MANUFACTURING EXAMPLES 4-8

Preparation of polyoxyalkylene polyamines

Polyoxyprophleneglycol diglycidylether (DENACOL EX-2000) and diethyltoluenediamine (Ethacure 100, Ethyl Corp.) were reacted, in a weight ratio of 1,100:360 (equivalent ratio of epoxy groups:amine active hydrogen of 1:8), at 140° C. for 6 hours to obtain a polyoxyalkylene polyamine (1) (Sample No. 1) (viscosity 3,100 cps, 25° C.).

Various polyoxyalkylene polyamines (Sample No. 2 to 5) were prepared in the same way, using the epoxy compounds and diamine compounds shown in Table 2.

| mold size | length | 400 mm |
|---|---|---|
|  | width | 300 mm |
|  | thickness | 3 mm |
| material temperature |  | 57 ± 2° C. |
| injection pressure |  | 150 ± 20 kg/cm² |
| injection speed |  | about 330 cc/sec. |
| mold temperature |  | 120 ± 2° C. |

After elapsing 1 minute, the molded product was taken out the mold and cured at 140° C.±2° C. for 30 minutes Properties of the thus obtained product were evaluated, following the test methods hereinafter stated, and the test results were shown in Table 3.

TABLE 2

Preparation of polyoxyalkylene polyamines

| Sample No. | (A) polyepoxy compound | (B) diamine compound | (A)/(B) weight ratio | (A)/(B) equiv. ratio | reaction conditions | viscosity of the product (cps at 25° C.) |
|---|---|---|---|---|---|---|
| 1 | polyoxypropylene glycoldiglycidyl ether*[5] | diethyl toluene diamine*[8] | 1,100/356 | 1/8 | 140° C. 6 hrs | 4,000 |
| 2 | polyoxypropylene glycoldiglycidyl ether*[5] | dimethyl thio toluene diamine*[9] | 1,100/428 | 1/8 | 160° C. 11 hrs | 6,500 |
| 3 | trimethylol propane polyglycidylether*[6] | diethyl toluene diamine*[8] | 145/712 | 1/16 | 90° C. 10 hrs | 18,000 |
| 4 | pentaerythritol polyglycidyl ether*[7] | diethyl toluene diamine*[8] | 231/1424 | 1/32 | 100° C. 8 hrs | 3,300 |
| 5 | trimethylol propane polyglycidylether*[6] | dimethyl thio toluene diamine*[9] | 145/1712 | 1/32 | 140° C. 4 hrs | 4,000 |

*[5] DENACOL EX-2000 (Trade mark, Nagase Kasei Kogyo K.K., epoxy equivalent about 1,100 g)
*[6] DENACOL EX-321 (Trade mark, Nagase Kasei Kogyo K.K., epoxy equivalent about 145 g)
*[7] DENACOL EX-411 (Trade mark, Nagase Kasei Kogyo K.K., epoxy equivalent about 231 g)
*[8] Ethacure 100 (Trade mark, Ethyl Corp., molecular weight 178)
*[9] Ethacure 300 (Trade mark, Ethyl Corp., molecular weight 214)

EXAMPLE 1

Polyamine mixture (A) consisting of 20 parts by weight of Jeffermine D-2000, 25 parts by weight of polyamine sample (1), 50 parts by weight of polyamine sample (3) and 5 parts by weight of Ethacure 100, and polyisocyanate mixture (B) consisting of 51 parts by

EXAMPLES 2-8 AND COMPARATIVE EXAMPLES 1-7

Using the materials shown in Table 3 and following the procedures stated in Example 1, various injection-molded products were prepared and evaluated as in Example 1.

Test results are shown in Table 3.

Evaluation methods

1. Molding property-1

Mold filling property of resinous composition was evaluated with the following standards.
- O ... keep and adequate flowability capable of being filled in a mold for 1.3 seconds counting from the start of material filling
- X ... substantial loss of flowability within 1.3 seconds from the start of material filling, resulting in the failure of adequate filling in a mold.

2. Molding property-2

Resinous composition was placed in a mold and subjected to an injection-molding.

After elapsing 1 minute, the injection molded product was taken out the mold and the presence of cracks in the molded product was examined.
- O ... no cracks
- X ... cracks 3. Flowability Viscosity of polyamine component and polyisocyanate component each was measured by using BH-type viscometer (Tokyo Keiki K.K.)
- O ... less than 3,500 cps at 25° C.
- X ... 3,500 cps or more at 25° C.

4. Heat-sag resistance

Heat resistance test was carried out following ASTM D 3,769 excepting changing over-hang length to 152 mm and test temperature to 190° C.
- O ... less than 6 mm of heat-sagging value
- Δ ... 6 mm or more, but less than 10 mm
- X ... 10 mm or more 5. Impact strength test Apparatus of JIS K 5400 (Impact resistance test method B) was used.

Test specimen was cut from the molded resin plate (about $100 \times 100 \times 3$ mm).

Impact deformation tester was horizontally fixed on a concrete rest, to which a hammer die having a radius of $6.35 \pm 0.03$ mm and a receptacle were secured.

A test specimen previously cooled to $-30°$ C. was placed between the hammer die and the receptacle, and a weight (about 1 kg weight) was also used to fall, from the height of about 40 cm, on said hammer die.

Then, the test specimen was carefully taken out and the presence of cracks was examined.
- O ... no cracks
- Δ ... cracks, but maintain the original form of test specimen
- X ... crush out

TABLE 3

|  | Example |  |  |  |  |  |  |  |
|---|---|---|---|---|---|---|---|---|
|  | 1 | 2 | 3 | 4 | 5 | 6 | 7 | 8 |
| aliphatic polyether polyamine (1) | | | | | | | | |
| T-5000 | | | | | | | | 20 |
| D-2000 | 20 | 20 | 20 | 20 | 20 | 20 | 15 | |
| polyether polyamine product (2) | | | | | | | | |
| Sample 1 | 25 | 25 | | 25 | 25 | 25 | 25 | 25 |
| Sample 2 | | | 26 | | | | | |
| polyether polyamine product (3) | | | | | | | | |
| Sample 3 | 50 | 50 | 50 | | | 50 | 50 | 50 |
| Sample 4 | | | | 40 | | | | |
| Sample 5 | | | | | 40 | | | |
| aromatic diamine (4) | | | | | | | | |
| DETDA | 5 | | 4 | 15 | 15 | 5 | 10 | 5 |
| DETTDA | | 5 | | | | | | |
| aromatic polyisocyanate Millionate MTL | 51 | 51 | 51 | 50 | 50 | 52 | 77 | 49 |
| aliphatic polyisocyanate Coronate EH | 15 | 15 | 15 | 15 | 15 | 15 | 5 | 15 |
| liq. polyisocyanate prepolymer | | | | | | | | |
| (a) | 70 | 70 | 70 | 69 | 69 | | | 68 |
| (b) | | | | | | 69 | | |
| (c) | | | | | | | 22 | |
| aromatic ring content (%) | 35.1 | 35.0 | 34.9 | 35.6 | 34.9 | 35.4 | 34.5 | 34.8 |
| polybutadiene chain content (%) | 8.5 | 8.5 | 8.5 | 8.4 | 8.4 | 7.8 | 8.0 | 8.4 |
| polyoxyalkylene polyamine content in (B) (%) | 8.1 | 8.1 | 8.1 | 4.2 | 4.2 | 8.1 | 9.4 | 8.3 |
| properties | | | | | | | | |
| molding property-1 | O | O | O | O | O | O | O | O |
| molding property-2 | O | O | O | O | O | O | O | O |
| flowability | O | O | O | O | O | O | O | O |
| heat-sag resistance | O | O | O | O | O | O | O | O |
| impact resistance | O | O | O | O | O | O | O | O |

|  | Comparative Example |  |  |  |  |  |  |
|---|---|---|---|---|---|---|---|
|  | 1 | 2 | 3 | 4 | 5 | 6 | 7 |
| aliphatic polyether polyamine (1) | | | | | | | |
| T-5000 | | | | 25 | 20 | | |
| D-2000 | 20 | | 15 | 25 | | 20 | 20 |
| polyether polyamine product (2) | | | | | | | |
| Sample 1 | 25 | 45 | 50 | | 30 | 25 | 25 |
| Sample 2 | | | | | | | |
| polyether polyamine product (3) | | | | | | | |
| Sample 3 | | 50 | 50 | | 50 | 50 | 50 |

TABLE 3-continued

Sample 4
Sample 5

| aromatic diamine (4) | | | | | | | |
|---|---|---|---|---|---|---|---|
| DETDA | 5 | 5 | 35 | 50 | | 5 | 5 |
| DETTDA | | | | | | | |
| aromatic polyisocyanate Millionate MTL | 33 | 24 | 26 | 33 | 15 | 70 | 25 |
| aliphatic polyisocyanate Coronate EH | | 15 | 5 | 15 | 15 | 15 | 20 |
| liq. polyisocyanate prepolymer | | | | | | | |
| (a) | 70 | 70 | 70 | 70 | 68 | | 35 |
| (b) | | | | | | | |
| (c) | | | | | | | |
| aromatic ring content (%) | 35.5 | 32.7 | 32.6 | 32.5 | 29.6 | 34.6 | 28.9 |
| polybutadiene chain content (%) | 9.9 | 9.6 | 10.0 | 9.2 | 9.8 | 0.0 | 5.5 |
| polyoxyalkylene polyamine content in (B) (%) | 9.4 | 9.2 | 0.0 | 0.0 | 9.7 | 10.3 | 10.6 |
| properties | | | | | | | |
| molding property-1 | X | ○ | ○ | X | X | ○ | ○ |
| molding property-2 | — | ○ | X | — | — | ○ | ○ |
| flowability | — | X | — | — | — | ○ | ○ |
| heat-sag resistance | — | ○ | — | — | — | ○ | ○ |
| impact resistance | — | ○ | — | — | — | X | X |

Note:
Jeffermine D-2000 (Trade mark. Texaco Chemical Comp.) Polyoxypropylene diaminie. molecular weight about 2.000. $NH_2$ equivalent about 1.040.
Jeffermine T-5000 (Trade mark. Texaco Chemical Comp.) Polyoxypropylene triamine. molecular weight about 5.000. $NH_2$ equivalent about 1.923.

What is claimed is:

1. A reactive injection molding resinous composition comprising,
   as polyamine components:
   (1) a polyoxyalkylene polyamine having an average molecular weight of 1,000 to 10,000 and containing in its molecule 2 or more aliphatic amino groups,
   (2) a polyoxyalkylene polyamine product (A) obtained by mixing (i) a polyoxyalkylene polyepoxy compound having an average molecular weight of 1,000 to 10,000 and containing in its molecule 2 or more epoxy groups and (ii) an aromatic diamine having a molecular weight of 108 to 400 so that amino groups become in excess of epoxy groups in terms of equivalent amounts and reacting the mixture, said product (A) being a mixture of the reacted polyoxyalkylene polyamine having in its molecule 2 or more aromatic amino groups and the unreacted aromatic diamine,
   (3) a polyoxyalkylene polyamine product (B) obtained by mixing (III) a polyoxyalkylene polyepoxy compound having an average molecular weight of 270 to 1,000 and containing in its molecule more than 2 epoxy groups and (ii) an aromatic diamine having a molecular weight of 108 to 400 so that amino groups become in excess of epoxy groups in terms of equivalent amounts and reacting the mixture, said product (B) being a mixture of the reacted polyoxyalkylene polyamine having in its molecule more than 2 aromatic amino groups and the unreacted aromatic diamine, and
   (4) an aromatic diamine having an average molecular weight of 122 to 400 and having at least one alkyl or thioalkyl substituent at the ortho position of the respective amino group, and as polyisocyanate components:
   (5) an aromatic polyisocyanate compound having an average molecular weight of 174 to 1,500 and containing in its molecule 2 or more isocyanate groups,
   (6) an aliphatic polyisocyanate compound having an average molecular weight of 158 to 1,500 and containing 2 or more isocyanate groups, and
   (7) a liquid polyisocyanate prepolymer product obtained by mixing an aromatic or aliphatic polyisocyanate compound having an average molecular weight of 158 to 1,500 and containing in its molecule 2 or more isocyanate groups and a liquid polydiene compound having an average molecular weight of 1,000 to 5,000 and containing in its molecule 2 or more reactive functional groups selected from hydroxyl, amino, carboxyl and epoxy groups so that isocyanate groups become in excess of said reactive functional groups the content of polydiene chain in the liquid polyisocyanate prepolymer product (7) being at least 6.5% by weight of the total weight of the composition and the total weight of aromatic ring contained in (1) to (7) being at most 40% by weight of the total weight of the composition, said reactive injection molding resinous composition being excellent in molding properties and capable of resulting in an injection-molded polyurea product having excellent heat resistance and impact strength.

2. A composition according to claim 1, wherein the ratio of average amino equivalent of polyamine components (1) to (4) to average isocyanate equivalent of polyisocyanate components (5) to (7) is 1:0.7–1:1.5.

3. A composition according to claim 1, wherein the content of polyoxyalkylene polyamine contained in the polyoxyalkylene polyamine product (B) is 3.0–10.0 weight % of the total weight of the composition.

4. A composition according to claim 1, wherein the content of polyoxyalkylene polyamine (1) is at most 30% by weight of the total polyamine components (1) to (4).

5. A composition according to claim 1, wherein the content of aliphatic polyisocyanate compound (6) is at most 20% by weight of the total polyisocyanate component.

6. A composition according to claim 2, wherein the content of polyoxyalkylene polyamine contained in the polyoxyalkylene polyamine product (B) is 3.0–10.0 weight % of the total weight of the composition.

* * * * *